US008201575B2

(12) United States Patent
Anderson et al.

(10) Patent No.: US 8,201,575 B2
(45) Date of Patent: Jun. 19, 2012

(54) AIR PRESSURE REGULATOR WITH FLOW SENSOR

(75) Inventors: Julia Anderson, Sterling Heights, MI (US); Larry Brice, Armada, MI (US); Anton Kristi, Romeo, MI (US)

(73) Assignee: Master Pneumatic-Detroit, Inc., Sterling Heights, MI (US)

( * ) Notice: Subject to any disclaimer, the term of this patent is extended or adjusted under 35 U.S.C. 154(b) by 910 days.

(21) Appl. No.: 12/175,046

(22) Filed: Jul. 17, 2008

(65) Prior Publication Data

US 2009/0020170 A1    Jan. 22, 2009

Related U.S. Application Data

(60) Provisional application No. 60/950,201, filed on Jul. 17, 2007.

(51) Int. Cl.
*F16K 31/36* (2006.01)
(52) U.S. Cl. .............. 137/505.42; 137/554; 137/557; 200/81.9 R; 200/83 R
(58) Field of Classification Search ............. 116/268; 137/505, 507, 551, 552, 554, 557; 200/81 R, 200/81.9 R, 83 R, 83 A, 83 B, 83 D, 83 Q
See application file for complete search history.

(56) References Cited

U.S. PATENT DOCUMENTS

| | | | | |
|---|---|---|---|---|
| 2,747,607 A * | 5/1956 | Matasovic | ............ | 137/505.42 |
| 4,085,305 A * | 4/1978 | Dietz | ............ | 200/83 A |
| 4,243,374 A * | 1/1981 | Demi | ............ | 431/89 |
| 4,377,090 A * | 3/1983 | Seulen | ............ | 73/861.74 |
| 4,468,170 A * | 8/1984 | Hanset | ............ | 417/44.3 |
| 4,489,751 A * | 12/1984 | Acomb et al. | ............ | 137/505.36 |
| 4,696,320 A * | 9/1987 | Bull | ............ | 137/116.5 |
| 4,719,940 A * | 1/1988 | Beavers | ............ | 137/505.39 |
| 4,805,305 A * | 2/1989 | Davis | ............ | 30/258 |
| 4,933,516 A * | 6/1990 | Brown | ............ | 200/81.9 R |
| 5,327,346 A | 7/1994 | Goodell | | |
| 6,357,469 B1 | 3/2002 | Bell | | |
| 6,401,743 B1 | 6/2002 | Naedler | | |
| 7,287,565 B2 | 10/2007 | Hottebart et al. | | |
| 2002/0101355 A1* | 8/2002 | Young | ............ | 340/606 |
| 2006/0081294 A1* | 4/2006 | Drexel et al. | ............ | 137/554 |
| 2006/0225790 A1* | 10/2006 | Boyer et al. | ............ | 137/505.34 |

* cited by examiner

*Primary Examiner* — Stephen M Hepperle
*Assistant Examiner* — R. K. Arundale
(74) *Attorney, Agent, or Firm* — Gifford, Krass, Sprinkle, Anderson & Citkowski, P.C.

(57) ABSTRACT

A combination air regulator and sensor assembly includes a head including a first chamber having an inlet and an outlet. A regulator dome including a second chamber is linked with the first chamber through a bore. The second chamber includes at least one outlet. A valve assembly is housed within the bore and moveable between closed and open positions sealing and allowing flow in the bore. A first diaphragm is positioned in the second chamber and linked with the valve assembly. The valve assembly moves in response to a pressure applied to the first diaphragm. A spring contacts the first diaphragm and applies a biasing force to the first diaphragm. A sensor dome including a third chamber is linked with the outlet of the second chamber. The sensor chamber includes a discharge outlet. A second diaphragm is positioned in the sensor chamber. The second diaphragm includes a rubber disk having a conductive contact ring attached on one side of the rubber disk and a non-conductive cup washer attached on the same side of the disk. The cup washer includes a hole formed there through allowing passage of air between opposing sides of the second diaphragm. A sensor spring contacts the second diaphragm and applies a biasing force to the second diaphragm. Electrical contacts are attached to the sensor chamber. The electrical contacts selectively engage the contact ring and are responsive to a differential pressure of the second diaphragm to define an electrical switch.

11 Claims, 3 Drawing Sheets

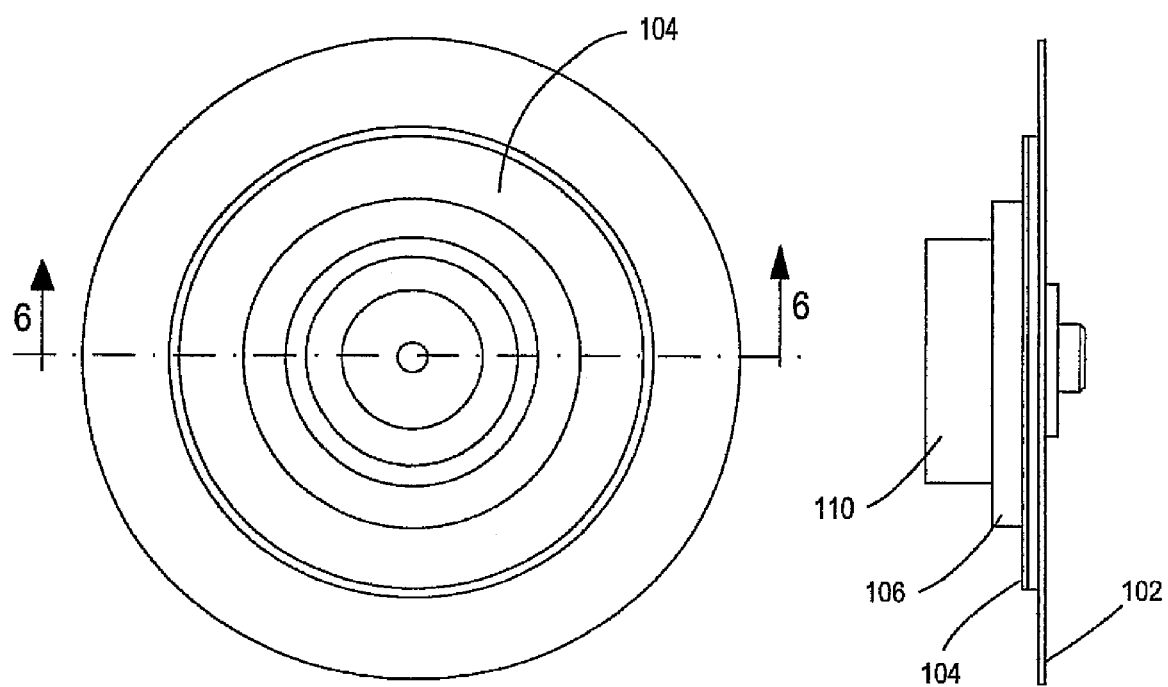
FIG. 7
FIG. 8
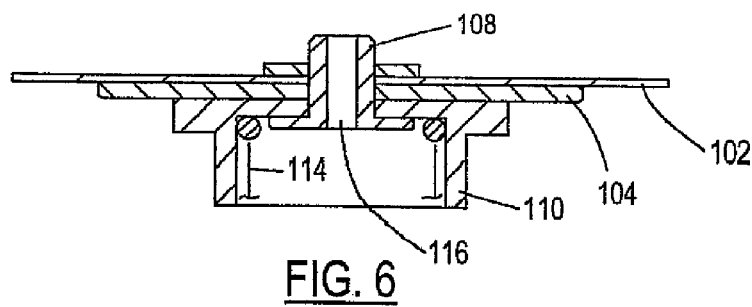
FIG. 6

AIR PRESSURE REGULATOR WITH FLOW SENSOR

CROSS REFERENCE TO RELATED APPLICATIONS

This application claims priority of U.S. Provisional Patent Application Ser. No. 60/950,201 filed Jul. 17, 2007, which is incorporated herein by reference.

FIELD OF THE INVENTION

The invention relates to air pressure regulators and more particularly to air pressure regulators having an integrated sensor.

BACKGROUND OF THE INVENTION

Some vehicle tire suspension systems may include a tire inflation system which supplies compressed air to tires which have air pressure below the target pressure. Such systems typically include a manually adjustable regulator to set the pressure and may include a separate flow sensor to provide a signal when there is a leak in the tire. There is therefore a need in the art for an improved regulator having an integrated sensor. There is also a need in the art for an improved regulator and sensor that does not actuate erroneously and give false sensor signals. There is also a need in the art for an improved regulator and sensor that is easy to assemble and is adjustable to provide for various pressure actuation ranges.

SUMMARY OF THE INVENTION

In a first aspect there is disclosed a combination air regulator and sensor assembly having a head including a first chamber having an inlet and an outlet. A regulator dome including a second chamber is linked with the first chamber through a bore. The second chamber includes at least one outlet. A valve assembly is housed within the bore and moveable between closed and open positions sealing and allowing flow in the bore. A first diaphragm is positioned in the second chamber and linked with the valve assembly. The valve assembly moves in response to a pressure applied to the first diaphragm. A spring contacts the first diaphragm and applies a biasing force to the first diaphragm. A sensor dome including a third chamber is linked with the outlet of the second chamber. The sensor chamber includes a discharge outlet. A second diaphragm is positioned in the sensor chamber. Electrical contacts are attached to the sensor chamber. The electrical contacts selectively engage a component of the second diaphragm responsive to a differential pressure of the second diaphragm to define an electrical switch.

In another aspect, there is disclosed a combination air regulator and sensor assembly having a head including a first chamber having an inlet and an outlet. A regulator dome including a second chamber is linked with the first chamber through a bore. The second chamber includes at least one outlet. A valve assembly is housed within the bore and moveable between closed and open positions sealing and allowing flow in the bore. A first diaphragm is positioned in the second chamber and linked with the valve assembly. The valve assembly moves in response to a pressure applied to the first diaphragm. A spring contacts the first diaphragm and applies a biasing force to the first diaphragm. A sensor dome including a third chamber is linked with the outlet of the second chamber. The sensor chamber includes a discharge outlet. A second diaphragm is positioned in the sensor chamber. The second diaphragm includes a rubber disk having a conductive contact ring attached on one side of the rubber disk and a non-conductive cup washer attached on the same side of the disk. The cup washer includes a hole formed there through allowing passage of air between opposing sides of the second diaphragm. Electrical contacts are attached to the sensor chamber. The electrical contacts selectively engage a component of the second diaphragm responsive to a differential pressure of the second diaphragm to define an electrical switch.

In another aspect, there is disclosed a combination air regulator and sensor assembly having a head including a first chamber having an inlet and an outlet. A regulator dome including a second chamber is linked with the first chamber through a bore. The second chamber includes at least one outlet. A valve assembly is housed within the bore and moveable between closed and open positions sealing and allowing flow in the bore. A first diaphragm is positioned in the second chamber and linked with the valve assembly. The valve assembly moves in response to a pressure applied to the first diaphragm. A spring contacts the first diaphragm and applies a biasing force to the first diaphragm. A sensor dome including a third chamber is linked with the outlet of the second chamber. The sensor chamber includes a discharge outlet. A second diaphragm is positioned in the sensor chamber. The second diaphragm includes a rubber disk having a conductive contact ring attached on one side of the rubber disk and a non-conductive cup washer attached on the same side of the disk. The cup washer includes a hole formed there through allowing passage of air between opposing sides of the second diaphragm. Electrical contacts are attached to the sensor chamber. The electrical contacts selectively engage the contact ring and are responsive to a differential pressure of the second diaphragm to define an electrical switch.

BRIEF DESCRIPTION OF THE DRAWINGS

FIG. 6 is a sectional view of a flow sensor diaphragm;
FIG. 7 is a top view of a flow sensor diaphragm;
FIG. 8 is a side view of a flow sensor diaphragm.

DESCRIPTION OF THE INVENTION

Figure 1:
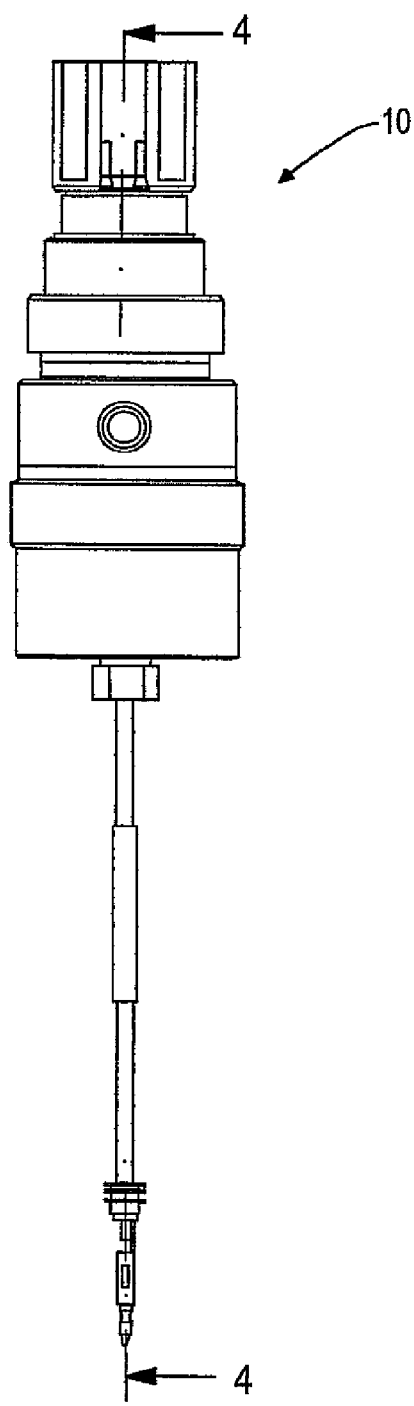
FIG. 1 is a side view of a pressure regulator and sensor.
Figure 2:
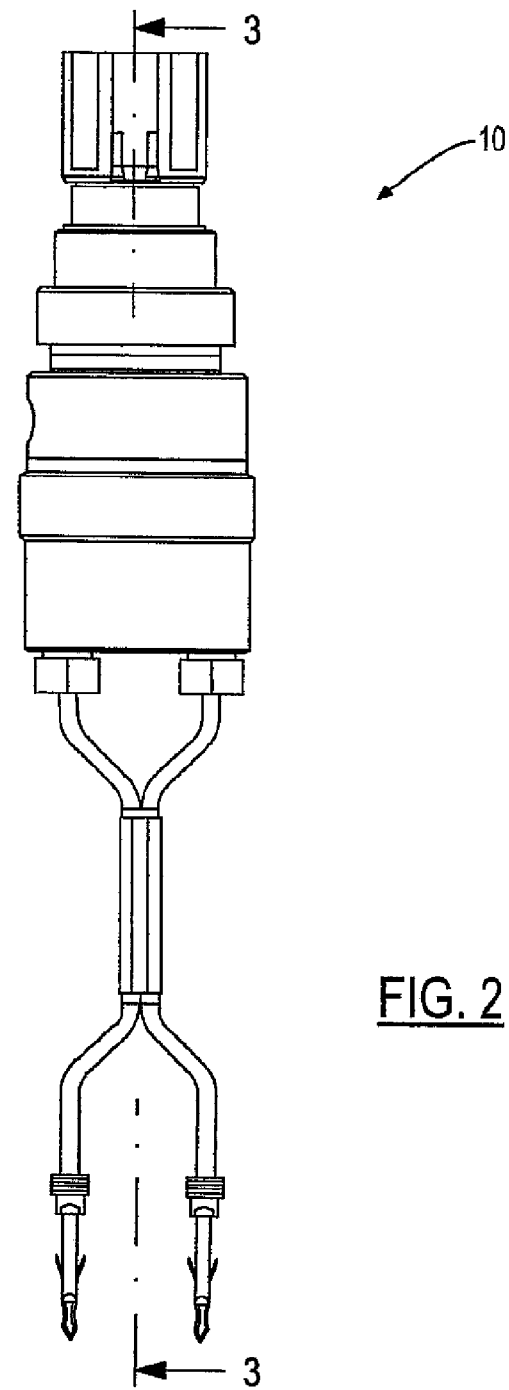
FIG. 2 is a front view of a pressure regulator and sensor.
Figure 5:
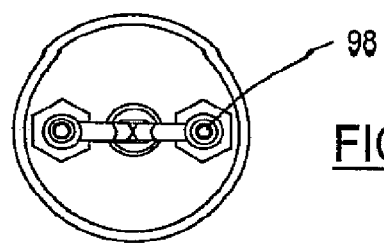
FIG. 5 is a top view of a pressure regulator and sensor.
Figure 3:
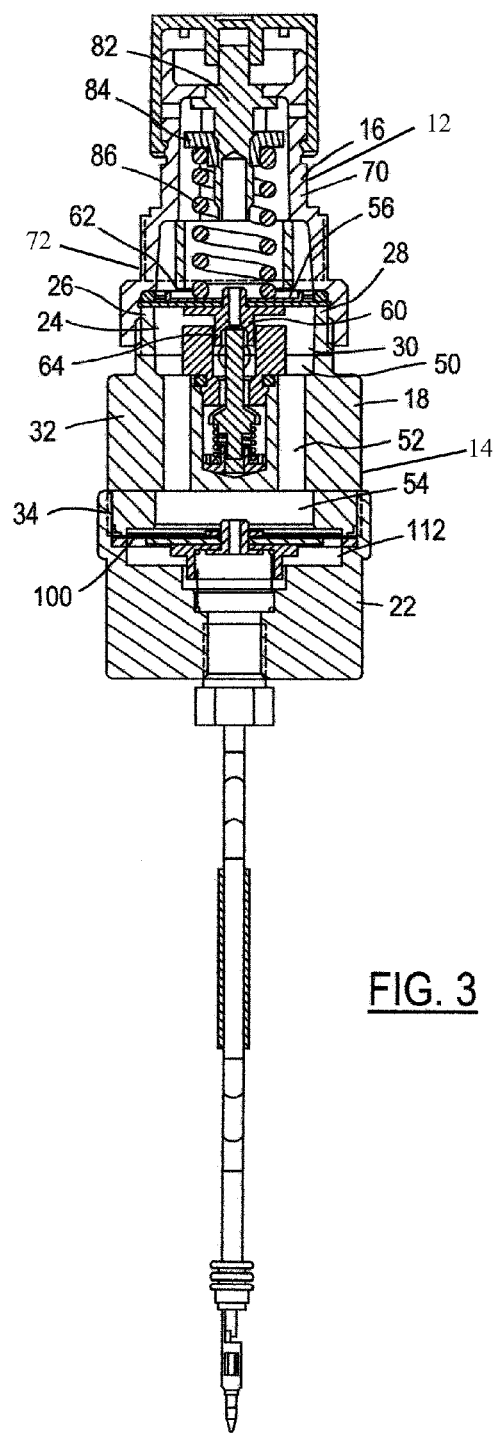
FIG. 3 is a side sectional view of a pressure regulator and sensor.
Figure 4:
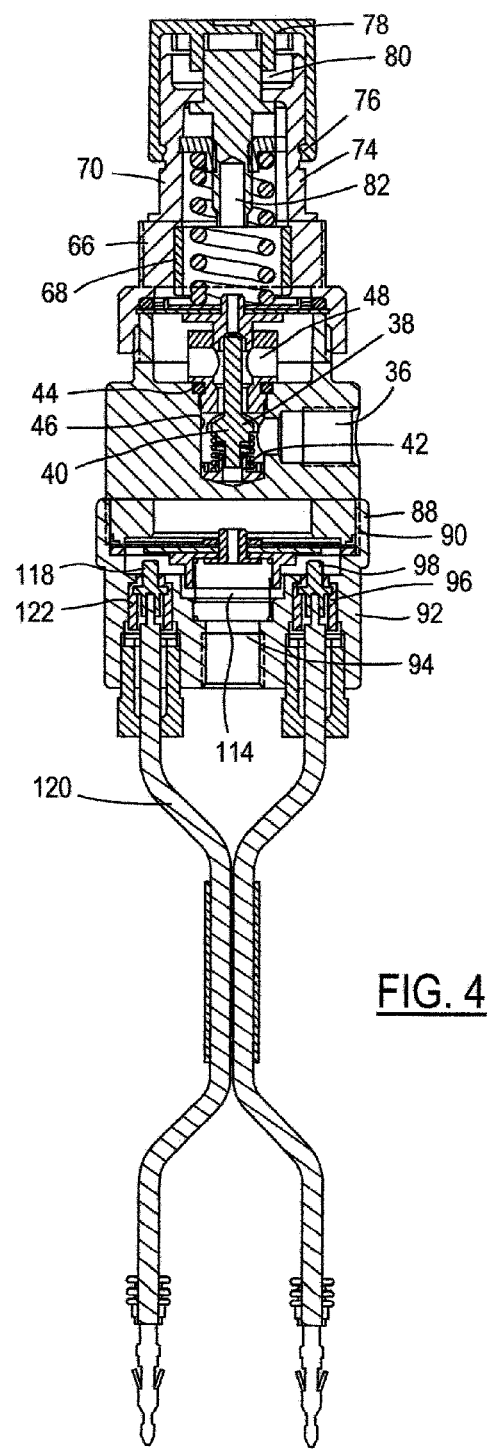
FIG. 4 is a front sectional view of a pressure regulator and sensor.

A combination air regulator and flow sensor assembly 10 for a pneumatic circuit is shown in FIGS. 1-4. The air regulator and flow sensor assembly 10 may be used in a number of applications, but it is particularly suited for a tire inflation system. The air regulator and flow sensor assembly 10 includes an adjustable air pressure regulator 12 and a diaphragm pressure sensor 14. The air regulator and flow sensor assembly 10 includes a regulator dome 16, a head 18 for a poppet valve 40 and a flow sensor dome 22. The head 18 may be formed of a metal such as aluminum and may be cylindrical in shape. Various of the components of the air regulator and flow sensor assembly 10 can be molded from zinc or Plastic. The molded components can be configured in a manner to accommodate an inlet filter and may also include a mounting structure, piping, and tube connections.

The head 18 includes an upper cylindrical wall 24 which is externally threaded 26. The inner surface 28 of the upper cylindrical wall 24 defines a first chamber 30 and a solid body portion 32 having external threads 34 for mounting to the flow sensor dome 22. This threaded interface can be a flange configuration with a series of screws to assemble. The body portion 32 has a radially extending bore 36. The bore 36 is threaded to receive an inlet fitting for pressurized air. The pressurized air is delivered through the radially extending bore 36 into an axially extending bore 38 housing a poppet valve 40, spring 42, and valve seat 44. The poppet valve 40 is biased against the valve seat 44 by the spring 42. The valve seat 44 has an axial bore 46 which receives an end of the poppet valve 40. When the poppet valve 40 is open air is allowed to pass through the axial bore 46 of the valve seat 44 and through a radial passage 48 into a second chamber 50 of the head 18. A pair of coaxially extending passages 52 extends from the second chamber to a third chamber 54 in the sensor dome 22. A first diaphragm 56 rests on a rim of the cylindrical wall to close the second chamber 50. The first diaphragm 56 includes a rubber disc 58 with a diaphragm retainer 60 mounted on one side and a metal diaphragm support 62 mounted on the other side. The diaphragm retainer 60 has an annular portion 63 which is formed to be received within the axial bore 46 of the valve seat 44. The annular portion 63 has a bore 64 formed to receive the upper end of the poppet valve 40.

The regulator dome 16 may be formed of a suitable moldable material such as acetal. The regulator dome 16 is generally cylindrical in shape having a lower cylindrical wall 66 with internal threads 68 to receive upper cylindrical wall 24 of the head 18. The regulator dome 16 has an intermediate portion 70 having external threads 72 for mounting to a control panel or other structure. An upper cylindrical portion 74 of the regulator dome 16 includes a circumferential groove 76 to engage an inner flange formed on an adjustment knob 78 which is rotatably mounted to the upper portion cylindrical portion 74. The knob 78 has an axially extending cavity 80 shaped to receive a complementary top portion of a metal adjustment screw 82. The adjustment screw 82 is threadably received in a metal spring rest 84 which has a hexagonal shape to be received within an inner hexagonally shaped chamber of the regulator dome 16. A spring 86 extends between the spring rest 84 and diaphragm support 62. When the knob 78 is turned, the adjustment screw 82 advances the spring rest 84 against the spring 86. The pressure of the compressed spring 86 forces the first diaphragm 56 down against the poppet valve 40 to regulate the air pressure. When the air pressure downstream drops below the preset level, the poppet valve 40 opens until the desired pressure is restored.

The flow sensor dome 22 includes an upper cylindrical wall 88 with a threaded inner surface 90 and a lower solid body portion 92. The solid body portion 92 has an axial bore 94 for receiving an outlet fitting. The solid body portion 92 also includes and a pair of diametrically opposed coaxial bores 96 holding electrical contacts 98. Alternatively, the flow sensor dome may be connected to the lower body portion by a flange and screws.

The upper cylindrical wall 88 defines the third chamber 54 and includes a second or flow sensor diaphragm 100. The second diaphragm 100 includes a rubber disc 102, a conductive contact ring 104, a non-conductive cup washer 106 and a diaphragm retainer 108 as seen in FIG. 6. The rubber disc 102 extends fully across the third chamber 54. The contact ring 104 has a diameter which is less than that of the rubber disc 102 but extends the width of the electrical contacts 98 mounted in the sensor dome 22. The cup washer 106 has an annular flange 110 extending downwardly into a portion of the axial outlet bore 112 to be biased upwardly by a sensor spring 114. The annular flange 110 acts as a guide for the second diaphragm 100. A hole 116 passes through the center of the assembly to permit air to flow from the third chamber 54 through the second diaphragm 100 and into the axial outlet bore 112. The sensor spring 114 applies biasing force keeping the contact ring 104 from coming into contact with the electrical contacts 98 mounted in the sensor dome 22.

The electrical contacts 98 include a pin terminal 118 which is connected to a wire 120. A PVC tubing 122 extends around the pin terminal 118 and the wire 120 to insulate the pin from contact with the sensor dome 22. A contact insulator and seal washer formed of nylon and a nylon plug or pressed in bushing which has an axial bore to receive the wire is threaded into the body of the sensor dome 22 to hold the wire 120 in place. The wires 120 and contact ring 104 act as an electrical switch for a circuit having a warning device. Thus when a leak occurs downstream of the air regulator and flow sensor assembly 10, the poppet valve 40 opens to deliver pressurized air to the first diaphragm 56 which overcomes the biasing of the spring 86. If the volume of air passing through second diaphragm creates large enough pressure difference to overcome sensor spring 114, the contact ring 104 moves into contact with the contacts 98 to complete an electrical circuit. When the circuit is closed, current is supplied to a warning light or alarm to indicate leakage in the tire.

Thus is disclosed an effective one-piece assembly for use in a pneumatic system having an adjustable regulator and flow sensor. The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A combination air regulator and sensor assembly comprising:
   a head including a first chamber having an inlet and an outlet, a regulator dome including a second chamber linked with the first chamber through a bore, the second chamber including at least one outlet;
   a valve assembly housed within the bore and moveable between closed and open positions sealing and allowing flow in the bore;
   a first diaphragm positioned in the second chamber and linked with the valve assembly, the valve assembly moving in response to a pressure applied to the first diaphragm;
   a spring contacting the first diaphragm and applying a biasing force to the first diaphragm;
   a sensor dome including a third chamber linked with the outlet of the second chamber, and the sensor dome including a sensor chamber including a discharge outlet,
   a second diaphragm positioned in the sensor chamber, the second diaphragm including a rubber disk having a conductive contact ring attached on one side of the rubber disk and a non-conductive cup washer attached on the same side of the disk, the cup washer including a hole formed there through allowing passage of air between opposing sides of the second diaphragm;
   electrical contacts attached to the sensor chamber, the electrical contacts selectively engaging the contact ring and responsive to a differential pressure of the second diaphragm to define an electrical switch.

2. The combination air regulator and sensor assembly of claim 1 including an adjustment knob linked with the spring for adjusting a compression of the spring.

3. The combination air regulator and sensor assembly of claim 1 wherein the head includes an upper wall with external threads formed thereon for connection with internal threads formed on the regulator dome.

4. The combination air regulator and sensor assembly of claim 1 wherein the head includes a lower wall with external threads formed thereon for connection with internal threads formed on the sensor dome.

5. The combination air regulator and sensor assembly of claim 1 wherein the inlet of the first chamber is a radial bore formed in the head.

6. The combination air regulator and sensor assembly of claim 1 wherein the first diaphragm includes a rubber disk having a support mounted on one side of the diaphragm and a retainer mounted on the other side, the retainer including an annular portion received in the bore and receiving an upper end of the valve assembly.

7. The combination air regulator and sensor assembly of claim 1 wherein the valve assembly includes a poppet valve biased by a spring to engage a valve seat positioned about the bore.

8. The combination air regulator and sensor assembly of claim 1 wherein the at least one outlet of the second chamber includes a pair of longitudinally extending passages.

9. The combination air regulator and sensor assembly of claim 1 wherein the regulator dome includes external threads formed thereon for mounting to a control panel.

10. The combination air regulator and sensor assembly of claim 1 wherein the adjustment knob includes an axially extending cavity receiving and retaining a top portion of an adjustment screw, the adjustment screw including a spring rest formed thereon for contacting a first end of the spring, the second end of the spring contacting the first diaphragm.

11. The combination air regulator and sensor assembly of claim 1 wherein the cup washer includes an annular flange receiving a sensor spring biasing the second diaphragm away from contact with the electrical contacts.

\* \* \* \* \*